(12) United States Patent
Izadian et al.

(10) Patent No.: US 10,193,225 B2
(45) Date of Patent: *Jan. 29, 2019

(54) BEAM FORMING NETWORK FOR FEEDING SHORT WALL SLOTTED WAVEGUIDE ARRAYS

(71) Applicant: Waymo LLC, Mountain View, CA (US)

(72) Inventors: Jamal Izadian, Mountain View, CA (US); Russell Leigh Smith, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/440,758

(22) Filed: Feb. 23, 2017

(65) Prior Publication Data
US 2017/0162938 A1    Jun. 8, 2017

Related U.S. Application Data

(63) Continuation of application No. 14/461,417, filed on Aug. 17, 2014, now Pat. No. 9,612,317.

(51) Int. Cl.
*G01S 7/03* (2006.01)
*H01Q 3/40* (2006.01)
(Continued)

(52) U.S. Cl.
CPC ............... *H01Q 3/40* (2013.01); *G01S 7/03* (2013.01); *G01S 7/032* (2013.01); *H01P 1/182* (2013.01);
(Continued)

(58) Field of Classification Search
CPC .......... G01S 7/03; G01S 13/02; G01S 13/931; H01Q 21/0006; H01Q 3/40; H01Q 21/0005; H01P 1/182; H04B 7/0617
See application file for complete search history.

(56) References Cited

U.S. PATENT DOCUMENTS 4,356,462 A * 10/1982 Bowman .................... H01P 5/12
                                                    333/128
4,878,724 A * 11/1989 Thaniyavarn ......... H01S 5/4025
                                                    372/33

(Continued)

OTHER PUBLICATIONS

Search Report and Written Opinion for PCT/US2015/041513 dated Mar. 2, 2017.

*Primary Examiner* — Matthew M Barker
(74) *Attorney, Agent, or Firm* — McDonnell Boehnen Hulbert & Berghoff LLP

(57) ABSTRACT

An example method for a beamforming network for feeding short wall slotted waveguide arrays. The beamforming network may include six beamforming network outputs, where each beamforming network output is coupled to one of a set of waveguide inputs. Further, the beamforming network may include a cascaded set of dividers configured to split electromagnetic energy from a beamforming network input to the six phase-adjustment sections. The cascade may include a first level of the cascade configured to split the electromagnetic energy from the beamforming network input into two first-level beamforming waveguides, a second level configured to split the electromagnetic energy from each of two first-level beamforming waveguides into two respective second-level beamforming waveguides, and a third level of the cascade configured to split the electromagnetic energy from one of two respective second-level beamforming waveguides into two respective third-level beamforming waveguides.

18 Claims, 8 Drawing Sheets

(51) Int. Cl.
*H04B 7/06* (2006.01)
*H01P 1/18* (2006.01)
*H01Q 21/00* (2006.01)
*H01P 5/18* (2006.01)
*G01S 13/02* (2006.01)
*G01S 13/93* (2006.01)

(52) U.S. Cl.
CPC ........... *H01P 5/182* (2013.01); *H01Q 21/005* (2013.01); *H01Q 21/0043* (2013.01); *H04B 7/0617* (2013.01); *G01S 13/02* (2013.01); *G01S 13/931* (2013.01)

(56) References Cited

U.S. PATENT DOCUMENTS

| | | | |
|---|---|---|---|
| 6,922,116 B1* | 7/2005 | Gordon | H01Q 1/246 333/100 |
| 6,972,716 B2* | 12/2005 | Davis | H01Q 3/22 342/368 |
| 9,013,359 B2* | 4/2015 | Lenormand | H01Q 21/0043 343/771 |
| 9,343,795 B1* | 5/2016 | Halligan | H01P 5/16 |
| 2004/0100402 A1* | 5/2004 | McCandless | H01Q 21/22 342/368 |
| 2011/0175780 A1* | 7/2011 | Gatti | H01Q 13/22 343/766 |
| 2013/0141186 A1* | 6/2013 | Nguyen | H01P 5/12 333/137 |

* cited by examiner

BEAM FORMING NETWORK FOR FEEDING SHORT WALL SLOTTED WAVEGUIDE ARRAYS

CROSS REFERENCE TO RELATED APPLICATION

The present application claims priority to U.S. patent application Ser. No. 14/461,417, filed on Aug. 17, 2014, the entire contents of which are herein incorporated by reference.

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to a millimeter (mm) wave electromagnetic wave length (e.g., 3.9 mm for 77 GHz). These radar systems may use antennas that can to focus the radiated energy into tight beams in order to enable the radar system to measure an environment with high accuracy, such as an environment around an autonomous vehicle. Such antennas may be compact (typically with rectangular form factors), efficient (i.e., with little of the 77 GHz energy lost to heat in the antenna or reflected back into the transmitter electronics), and low cost and easy to manufacture (i.e., radar systems with these antennas can be made in high volume).

SUMMARY

In a first aspect, the present application discloses embodiments that relate to a radar system. The radar system may include six radiating waveguides located in a waveguide layer. Each radiating waveguide may have a radiating waveguide input. Additionally, each radiating waveguide may have a height and a width equal that are equal to that of each other radiating waveguides. The radiating waveguides may be aligned on a plane defined by a center of the width of the radiating waveguide and a length of the radiating waveguide. Further, each radiating waveguide is coupled to at least one radiating element located in a radiating layer. The radar system may also include a beamforming network located in the waveguide layer. The beamforming network may include a beamforming network input. Additionally, the beamforming network may include six beamforming network outputs, where each beamforming network output is coupled to one of the radiating waveguide inputs. Further, the beamforming network may include six phase-adjustment sections. Each of the phase-adjustment sections may be coupled a respective one of the six cascade outputs. Still further, the beamforming network may include a cascaded set of dividers configured to split electromagnetic energy from the beamforming network input to the six phase-adjustment sections. The cascade may include a first level of the cascade configured to split the electromagnetic energy from the beamforming network input into two first-level beamforming waveguides. The cascade may also include a second level of the cascade configured to split the electromagnetic energy from each of two first-level beamforming waveguides into two respective second-level beamforming waveguides for each respective first-level beamforming waveguide. One of two respective second-level beamforming waveguides for each respective first-level beamforming waveguide may be coupled to one of the phase-adjustment sections. The cascade may also include a third level of the cascade configured to split the electromagnetic energy from one of two respective second-level beamforming waveguides for each respective first-level beamforming waveguide into two respective third-level beamforming waveguides for each respective second-level beamforming waveguides. Each of the third-level beamforming waveguides may be coupled to a respective one of the phase-adjustment sections.

In another aspect, the present application describes a method of radiating electromagnetic energy. The method includes receiving electromagnetic energy by a beamforming network input. The method also includes splitting the received electromagnetic energy with a cascaded set of dividers to form six divided electromagnetic energy streams coupled into six phase-adjustment sections. The splitting includes splitting the electromagnetic energy from the beamforming network input into two first-level beamforming waveguides by a first level of the cascade. The splitting also includes splitting the electromagnetic energy from each of two first-level beamforming waveguides into two respective second-level beamforming waveguides for each respective first-level beamforming waveguide by a second level of the cascade, where one of two respective second-level beamforming waveguides for each respective first-level beamforming waveguide is coupled to one of the phase-adjustment sections. The splitting also includes splitting the electromagnetic energy from one of two respective second-level beamforming waveguides for each respective first-level beamforming waveguide into two respective third-level beamforming waveguides for each respective second-level beamforming waveguides by a third level of the cascade, where each of the third-level beamforming waveguides is coupled to a respective one of the phase-adjustment sections. The method further includes adjusting the phase of each of the six electromagnetic energy streams by the six phase-adjustment sections to form six phase adjusted electromagnetic energy streams. The method additionally includes coupling each of the six phase adjusted electromagnetic energy streams into a respective radiating waveguide of six radiating waveguides located in a waveguide layer, where each radiating waveguide is coupled to at least one radiating element located in a radiating layer. The method yet further includes for each radiating waveguide, radiating at least a portion of the phase adjusted electromagnetic energy stream by a radiating element.

In yet another aspect, the present application describes beamforming network located in a waveguide layer. The beamforming network includes a beamforming network input. Additionally, the beamforming network includes six beamforming network outputs, where each beamforming network output is coupled to a respective waveguide input of a set of waveguides. The beamforming network further includes a cascaded set of dividers coupled to six phase-adjustment sections, where each cascade is configured to distribute electromagnetic energy from the beamforming network input to the six phase-adjustment sections based on a predetermined taper profile. The cascade may include a first level of the cascade configured to approximately evenly split the electromagnetic energy from the beamforming network input into two first-level beamforming waveguides. The cascade may further include a second level of the cascade configured to split the electromagnetic energy from each of two first-level beamforming waveguides into two respective second-level beamforming waveguides for each respective first-level beamforming waveguide, where one of two respective second-level beamforming waveguides for each respective first-level beamforming waveguide is coupled to one of the phase-adjustment sections. And, the cascade may also include a third level of the cascade configured to split the electromagnetic energy from one of two respective second-level beamforming waveguides for each respective first-level beamforming waveguide into two respective third-level beamforming waveguides for each respective second-level beamforming waveguides, where each of the third-level beamforming waveguides is coupled to a respective one of the phase-adjustment sections. Additionally, each phase-adjustment section has a respective length that provides a respective phase offset for each waveguide.

In another aspect, the present application describes an apparatus for radiating electromagnetic energy. The apparatus includes means for receiving electromagnetic energy. The apparatus also includes means for splitting the received electromagnetic energy to form six divided electromagnetic energy streams. The means for splitting includes splitting the electromagnetic energy from the means for receiving into two first-level beamforming waveguides. The means for splitting also includes splitting the electromagnetic energy from each of two first-level beamforming waveguides into two respective second-level beamforming waveguides for each respective first-level beamforming waveguide, where one of two respective second-level beamforming waveguides for each respective first-level beamforming waveguide is coupled to one of the means for phase-adjustment. The means for splitting also includes splitting the electromagnetic energy from one of two respective second-level beamforming waveguides for each respective first-level beamforming waveguide into two respective third-level beamforming waveguides for each respective second-level beamforming waveguides, where each of the third-level beamforming waveguides is coupled to one of the means for phase-adjustment. The method further includes means for phase-adjustment of each of the six radiation electromagnetic energy streams to form six phase adjusted electromagnetic energy streams. The method additionally includes means for coupling each of the six phase adjusted electromagnetic energy streams into a respective radiating waveguide of six radiating waveguides located in a waveguide layer, where each radiating waveguide is coupled to at least means for radiating located in a radiating layer. The method yet further includes for each radiating waveguide, means for radiating at least a portion of the phase adjusted electromagnetic energy stream.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
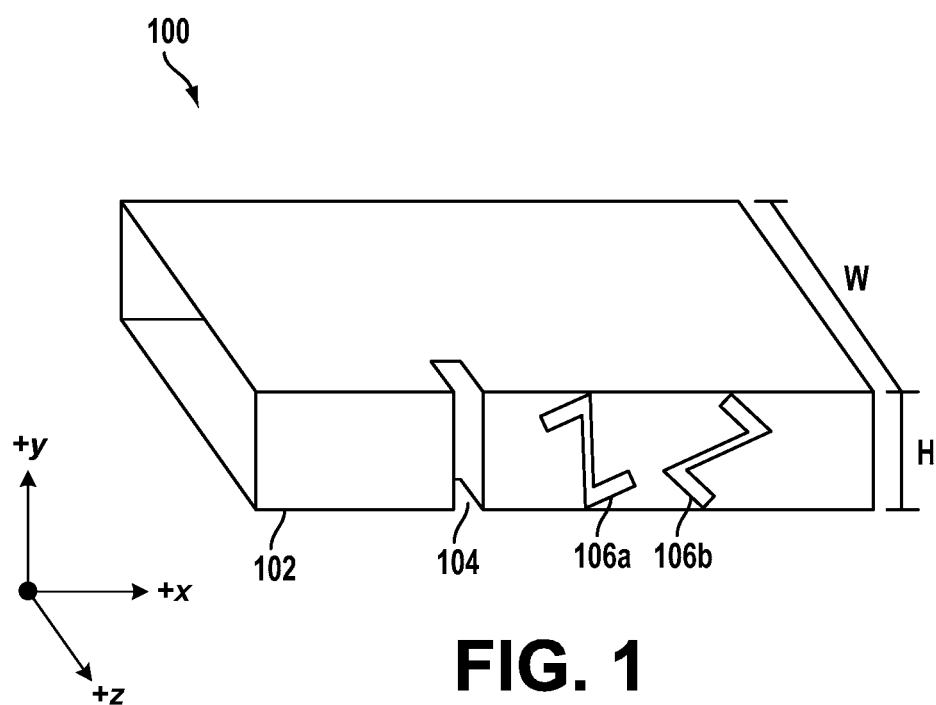
FIG. 1 illustrates an example of radiating slots on a waveguide.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description relates to an apparatus and method for a beamforming network for feeding short wall slotted waveguide arrays, such as an automotive, high-frequency (e.g., 77 GHz) radar antenna used for millimeter electromagnetic wave signaling. In practice, waveguides and waveguide antennas may be fabricated in various ways. For instance, for printed waveguide transmission line (PWTL) antennas, a conductive adhesive thin film can be used to adhere the various layers of the PWTL antennas together. However, the performance of such an antenna may be less than optimal because the radiation efficiency and gain of the antenna is highly dependent on the conductivity of the conductive adhesive layer and its alignment and the time of the laminations. Additionally, the performance of such a waveguide may be less than optimal because the PWTL construction may introduce transmission losses into the waveguide.

For this reason, soldering (or metal to metal fusion) may provide better adhesion between metal layers, such as an aluminum sheet metal layer (with copper plating) adhered to copper foil/sheets. Sheet metals may be adhered to other sheet metals rather than foils, in other examples. Additionally, in some examples, before metal layers are adhered, various structures may be created in the respective metal layers. After adhesion, the various structures may form a waveguide unit, such as a waveguide unit for use in autonomous vehicles.

In one example a bottom layer may have a port feature. The port feature may enable electromagnetic energy (such as an electromagnetic wave) to enter the waveguide unit. The port feature may allow electromagnetic energy from a signal generation unit to be coupled into the waveguide unit for transmission into the environment around the waveguide unit (or around a vehicle to which the waveguide unit is coupled). Additionally, the port may enable electromagnetic energy within the waveguide unit to be coupled out of the waveguide unit. For example, when the waveguide unit receives electromagnetic energy, it may couple the electromagnetic energy out the port to processing electronics. Therefore, the port may function as a gateway between the waveguide unit and the signal generation and/or processing electronics that may operate the waveguide unit.

A middle layer may be coupled to both the bottom layer and the top layer. The middle layer may be referred to as a waveguide layer. The middle layer may have at least one waveguide in it. The waveguide may have a width that is measured with respect to a thickness of the middle layer (e.g. a maximum width of the waveguide in the middle layer may be equal to the thickness of the middle layer). Further, the height of the waveguide may be measured in the direction parallel to the plane in which the layers are adhered to each other. Additionally, in some examples, the width of the waveguide is larger than the height of the waveguide. The waveguides in the waveguide layer may perform several functions, such as routing, joining, and splitting of the electromagnetic energy.

In one example, the middle layer may receive electromagnetic energy from a port in the bottom layer. The waveguide of the middle layer may split the electromagnetic energy and route the electromagnetic energy to at least one radiating structure located in the top layer. In another example, the middle layer may receive electromagnetic energy from the at least one radiating structure in the top layer. The waveguides of the middle layer may join the electromagnetic energy and route the electromagnetic energy to the port located in the bottom layer.

The top layer may include at least one radiating structure. The radiating structure may be etched, cut, or otherwise located on sheet of metal that is adhered to the middle layer. The radiating structure may be configured to perform at least one of two functions. First, the radiating structure may be configured to radiate electromagnetic energy propagating inside the waveguide out into free space (i.e. the radiating structure converts the guided energy in the waveguide into radiated energy propagating in free space). Second, the radiating structure may be configured to receive electromagnetic energy propagating in free space and route the received energy into the waveguide (i.e. the radiating structure converts the energy from free space into guided energy propagating in a waveguide).

In some embodiments, the radiating structure may take the form of a radiating slot. The radiating slot may have a length dimension. The length dimension may correspond to a resonant frequency of operation for the slot. The resonant frequency of the slot may be equal to, or substantially close to, the frequency of the electromagnetic energy in the waveguide. For example, the length of the slot may be resonant at approximate half the wavelength of the electromagnetic energy in the waveguide. In some examples, the resonant length of the slot may be greater than the height of the waveguide. If the slot was longer than the waveguide, energy may not couple to the slot correctly, as the effective length of the slot is the length of the slot to which energy inside the waveguide can couple (i.e. the portion of the slot that is open to the waveguide). Thus, the electromagnetic energy may not radiate from the slot. However, in some examples, the slot may be shaped in a way that the total length of the slot is equal to the resonant length, but the slot still fits within a height of the waveguide. These shapes may be Z, S, 7, or other similar shapes (e.g. the total length of the shape is the total slot effective length, the bend of the shape allows a longer slot in a smaller space). Therefore, the slot may function like a slot that is longer than the height of the waveguide but still resonate at the desired radiation frequency.

In one example of fabrication of the waveguide unit, the structures located on each layer may be placed, cut, etched, or milled on each layer before the layers are adhered together. Thus, the location of the elements may be located fairly precisely on each layer when each is machined. When the bottom layer is adhered to the middle layer, the port may be located directly under a waveguide section. Thus, the entire port may be open to the waveguide in the middle layer. Additionally, the radiating elements of the top layer may be positioned in a way that the entire radiating element may be located directly above a waveguide section. Thus, the entire radiating element may be open to the waveguide in the middle layer.

FIGS. 1-4 illustrate example waveguides and radar systems in which example apparatuses for folded radiation slots for short wall waveguide radiation may be implemented.

Referring now to the figures, FIG. 1 illustrates an example of radiating slots (104, 106a, 106b) on a waveguide 102 in waveguide unit 100. It should be understood that waveguide unit 100 presents one possible configuration of radiating slots (104, 106a, 106b) on a waveguide 102.

It should also be understood that a given application of such an antenna may determine appropriate dimensions and sizes for both the radiating slots (104, 106a, 106b) and the waveguide 102. For instance, as discussed above, some example radar systems may be configured to operate at an electromagnetic wave frequency of 77 GHz, which corresponds to a 3.9 millimeter electromagnetic wave length. At this frequency, the channels, ports, etc. of an apparatus fabricated by way of method 100 may be of given dimensions appropriated for the 77 GHz frequency. Other example antennas and antenna applications are possible as well.

Waveguide 102 of waveguide unit 100 has a height of H and a width of W. As shown in FIG. 1, the height of the waveguide extends in the Y direction and the width extends in the Z direction. Both the height and width of the waveguide may be chosen based on a frequency of operation for the waveguide 102. For example, when operating waveguide 102 at 77 GHz, the waveguide 102 may be constructed with a height H and width W to allow propagation of 77 GHz wave. An electromagnetic wave may propagate through the waveguide in the X direction. In some examples, the waveguide may have a standard size such as a WR-12 or WR-10. A WR-12 waveguide may support the propagation of electromagnetic waves between 60 GHz (5 mm wavelength) and 90 GHz (3.33 mm wavelength). Additionally, a WR-12 waveguide may have the internal dimensions of approximately 3.1 mm by 1.55 mm. A WR-10 waveguide may support the propagation of electromagnetic waves between 75 GHz (4 mm wavelength) and 110 GHz (2.727 mm wavelength). Additionally, a WR-12 waveguide may have the internal dimensions of approximately 2.54 mm by 1.27 mm. The dimensions of the WR-12 and the WR-10 waveguides are presented for examples. Other dimension are possible as well.

Waveguide 102 may be further configured to radiate the electromagnetic energy that is propagating through the waveguide. The radiating slots (104, 106a, 106b), as shown in FIG. 1, may be located on the surface of the waveguide 102. Additionally, as shown in FIG. 1, the radiating slots (104, 106a, 106b) may be located primarily on the side of the waveguide 102 with the height H dimension. Further, the radiating slots (104, 106a, 106b) may be configured to radiate electromagnetic energy in the Z direction.

The linear slot 104 may be a traditional waveguide radiating slot. A linear slot 104 may have a polarization in the same direction as the long dimension of the slot. The long dimension of the linear slot 104, measured in the Y direction, may be approximately one-half of the wavelength of the electromagnetic energy that is propagating through the waveguide. At 77 Ghz, the long dimension of the linear slot 104 may be approximately 1.95 mm to make the linear slot resonant. As shown in FIG. 1, the linear slot 104 may have a long dimension that is larger than the height H of the waveguide 102. Thus, the linear slot 104 may be too long to fit on just the side of the waveguide having the height H dimension. The linear slot 104 may continue on to the top and bottom of the waveguide 102. Additionally, a rotation of the linear slot 104 may be adjusted with respect to the orientation of the waveguide. By rotating the linear slot 104, an impedance of the linear slot 104 and a polarization and intensity of the radiation may be adjusted.

Additionally, the linear slot 104 has a width dimension that may be measured in the X direction. Generally, the width of the waveguide may be varied to adjust the bandwidth of the linear slot 104. In many embodiments, the width of the linear slot 104 may be approximately 10% of the wavelength of the electromagnetic energy that is propagating through the waveguide. At 77 Ghz, the width of the linear slot 104 may be approximately 0.39 mm. However, the width of the linear slot 104 may be made wider or narrower in various embodiments.

However, in some situations, it may not be practical or possible for a waveguide 102 to have a slot on any side other than the side of the waveguide having the height H dimension. For example, some manufacturing processes may create a waveguide structure in layers. The layers may cause only one side of the waveguide to be exposed to free space. When the layers are created, the top and bottom of the respective waveguide may not be exposed to free space. Thus, a radiating slot that extends to the top and bottom of the waveguide would not be fully exposed to free space, and therefore would not function correctly, in some configurations of the waveguide. Therefore, in some embodiments, folded slots 106a and 106b may be used to radiate electromagnetic energy from the inside the waveguide.

A waveguide may include slots of varied dimensions, such as folded slots 106a and 106b, in order to radiate electromagnetic energy. For example, folded slots 106a and 106b may be used on a waveguide in situations when a half-wavelength sized slot cannot fit on the side of the waveguide. The folded slots 106a and 106b each may have an associated length and width. The total length of the folded slots 106a and 106b, as measured through a curve or a bend in the folded slot, may be approximately equal to half the wavelength of the electromagnetic energy in the wave. Thus, at the same operating frequency, the folded slots 106a and 106b may have approximately the same overall length as the linear slot 104. As shown in FIG. 1, folded slots 106a and 106b are Z-Slots, as each is shaped like the letter Z. In various embodiments, other shapes may be used as well. For example, both S-Slots and 7-Slots may be used as well (where the slot is shaped like the letter or number it is named after).

The folded slots 106a and 106b may also each have a rotation. Similarly as described above, a rotation of the folded slots 106a and 106b may be adjusted with respect to the orientation of the waveguide. By rotating the folded slots 106a and 106b, an impedance of the folded slots 106a and 106b and a polarization of the radiation may be adjusted. The radiation intensity may also be varied by such a rotation, which can be used for amplitude tapers for arraying to lower Side Lobe Level (SLL). The SLL will be discussed further with respect to the array structure.

Figure 2:
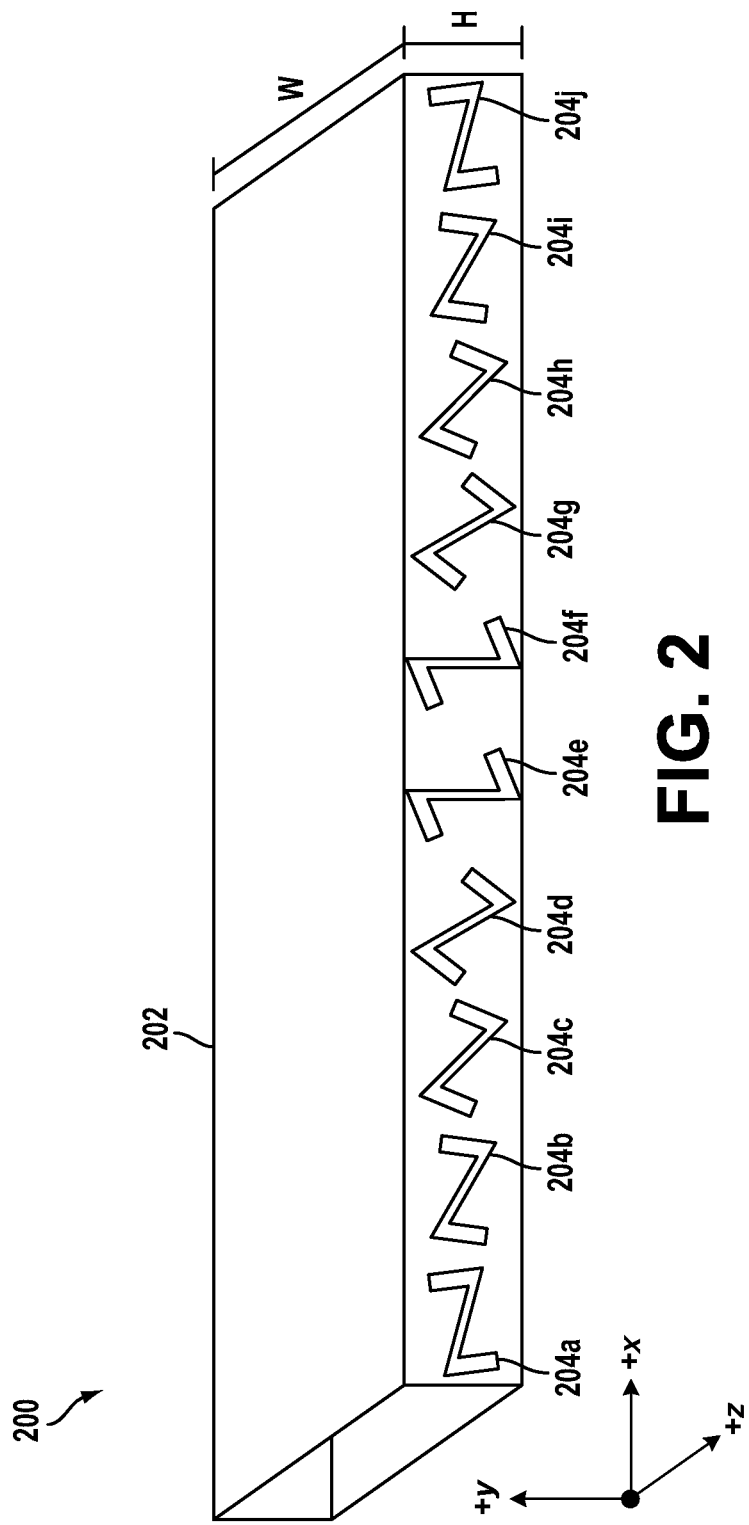
FIG. 2 illustrates an example waveguide with ten radiating Z-Slots.

FIG. 2 illustrates an example waveguide 202 with 10 radiating Z-Slots (204a-204j) in waveguide unit 200. As electromagnetic energy propagates down a waveguide 202, a portion of the electromagnetic energy may couple into one or more of the radiating Z-Slots (204a-204j) on the waveguide 202. Thus, each of the radiating Z-Slots (204a-204j) on the waveguide 202 may be configured to radiate an electromagnetic signal (in the Z direction). In some instances, each of the radiating Z-Slots (204a-204j) may have an associated impedance. The impedance for each respective radiating Z-Slot (204a-204j) may be a function of both the dimensions of the respective slot and the rotation of the respective slot. The impedance of each respective slot may determine a coupling coefficient for each respective radiating Z-Slot. The coupling coefficient determines a percentage of the electromagnetic energy propagating down a waveguide 202 that is radiated by the respective Z-Slot.

In some embodiments, the radiating Z-Slots (204a-204j) may be configured with rotations based on a taper profile. The taper profile may specify a given coupling coefficient for each radiating Z-Slots (204a-204j). Additionally, the taper profile may be chosen to radiate a beam with a desired beamwidth. For example, in one embodiment shown in FIG. 2, in order to obtain the taper profile, the radiating Z-Slots (204a-204j) may each have an associated rotation. The rotation of each radiating Z-Slot (204a-204j) may cause the impedance of each slot to be different, and thus cause the coupling coefficient for each radiating Z-Slot (204a-204j) to correspond to the taper profile. The taper profile of the radiating Z-Slots 204a-204j of the waveguide 202, as well as taper profiles of other radiating Z-Slots of other waveguides may control a beamwidth of an antenna array that includes a group of such waveguides. The taper profile may also be used to control SLL of the radiation. When an array radiates electromagnetic energy, the energy is generally radiated into a main beam and side lobes. Typically, sidelobes are an undesirable side effect from an array. Thus, the taper profile may be chosen to minimize or reduce the SLL (i.e. the amount of energy radiated in sidelobes) from the array.

Figure 3:
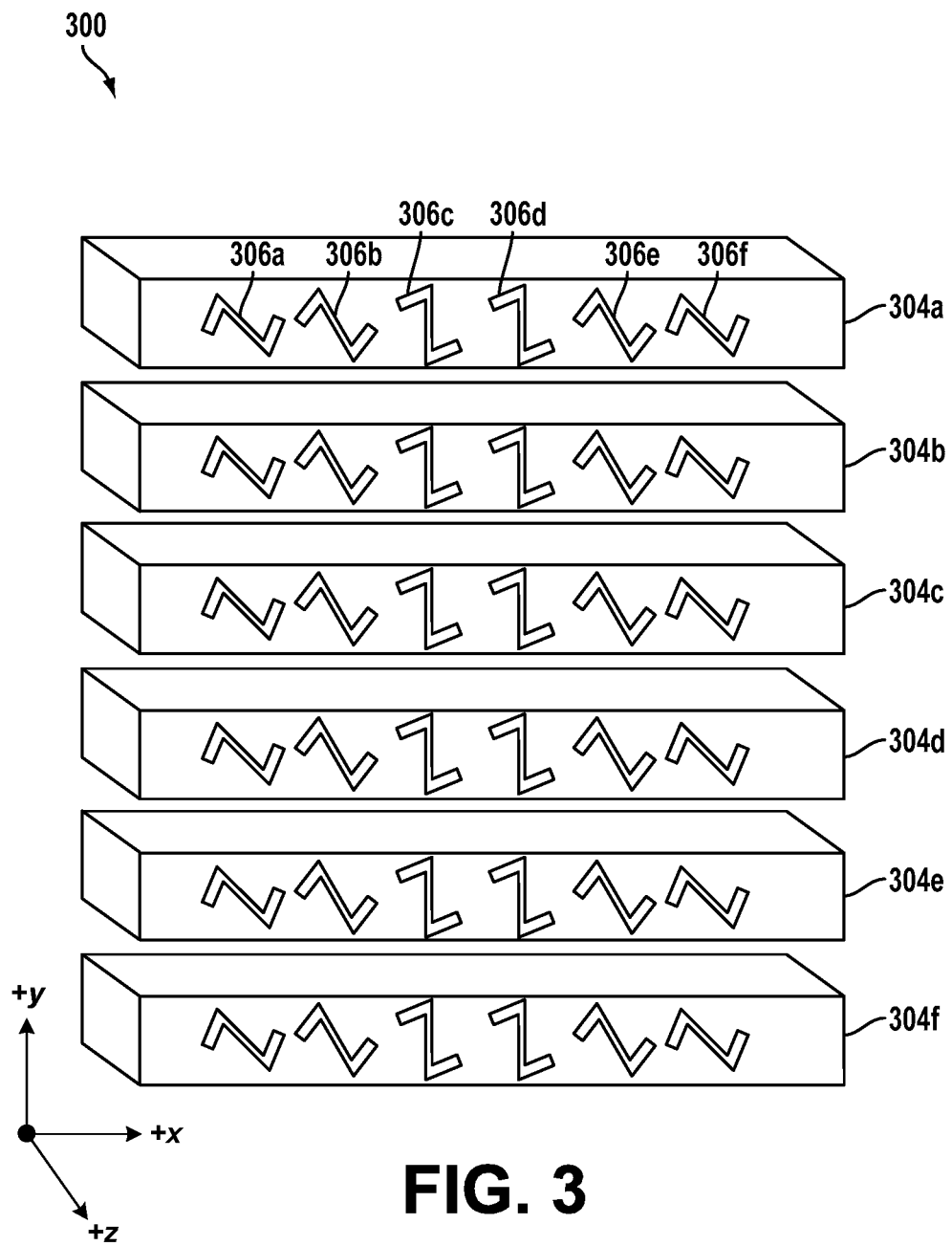
FIG. 3 illustrates an example radar system with six radiating waveguides.

FIG. 3 illustrates an example radar system 300 with six radiating waveguides 304a-304f. Each of the six radiating waveguides 304a-304f may have radiating Z-Slots 306a-306f. Each of the six radiating waveguides 304a-304f may be similar to the waveguide 202 described with respect to FIG. 2. In some embodiments, a group of waveguides, each containing radiating slots, may be known as an antenna array. The configuration of the six radiating waveguides 304a-304f of the antenna array may be based on both a desired radiation pattern and a manufacturing process for the radar system 300. Two of the components of the radiation pattern of the radar system 300 include a beam width as well as a beam angle. For example, similar to as discussed with FIG. 2, a taper profile of the radiating Z-Slots 306a-306f of each of the radiating waveguides 304a-304f may control a beamwidth of the antenna array. A beamwidth of the radar system 300 may correspond to an angle with respect to the antenna plane (e.g. the X-Y plane) over which a majority of the radar system's radiated energy is directed.

Figure 4:
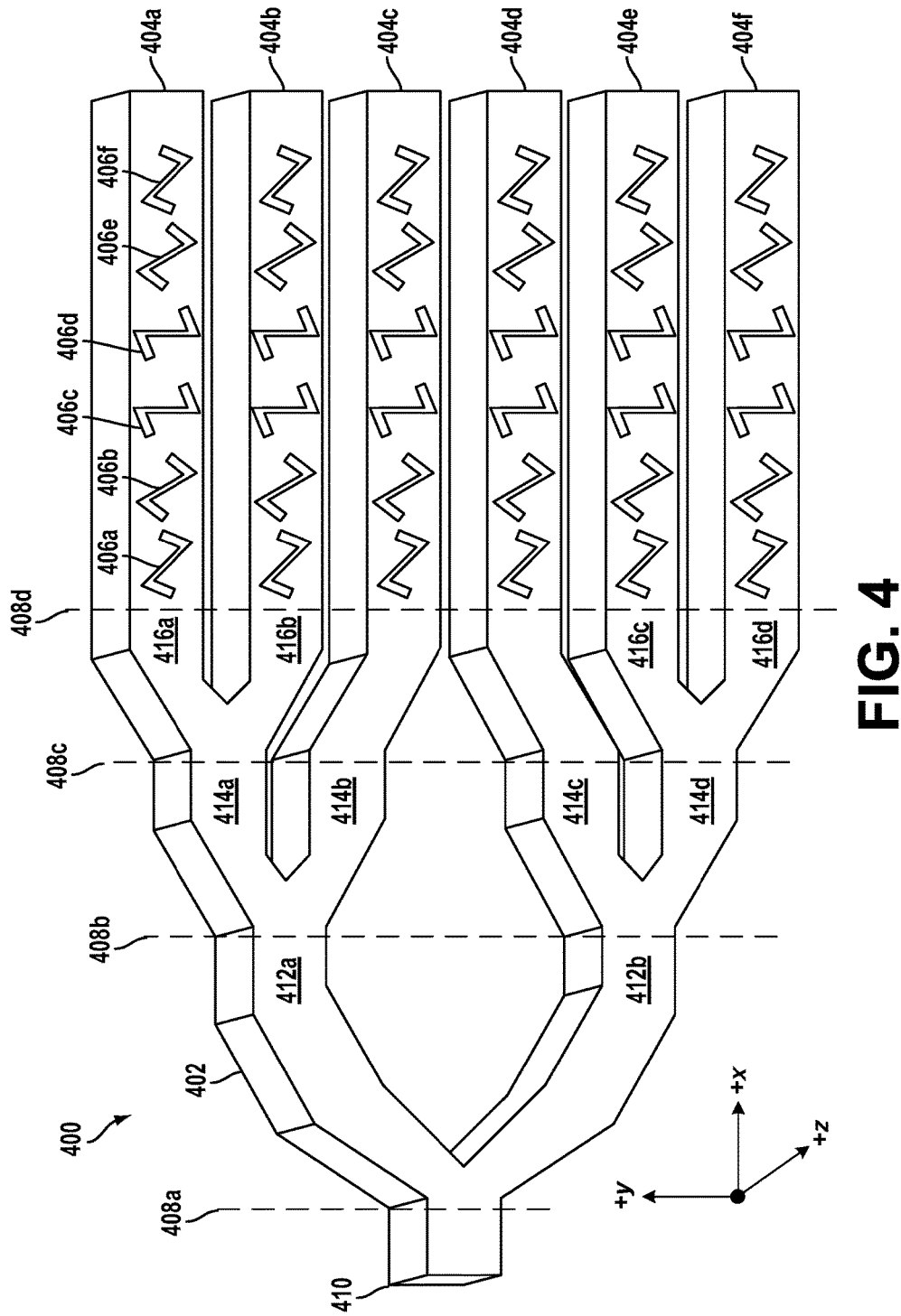
FIG. 4 illustrates an example radar system with six radiating waveguides and a waveguide feed system.

FIG. 4 illustrates an example radar system 400 with six radiating waveguides 404a-404f and a waveguide feed system 402. The six radiating waveguides 404a-404f may be similar to the six radiating waveguides 304a-304f of FIG. 3. In some embodiments, the waveguide feed system 402 may be configured to receive an electromagnetic signal at an input port 410 and divide the electromagnetic signal between the six radiating waveguides 404a-404f. Thus, the signal that each radiating Z-Slot 406a-406f of each of the radiating waveguides 404a-404f radiates may propagate in the X direction through the waveguide feed system. In various embodiments, the waveguide feed system 402 may have different shapes or configurations than that shown in FIG. 4. Based on the shape and configuration of the waveguide feed system 402 various parameters of the radiated signal may be adjusted. For example, both a direction and a beamwidth of a radiated beam may be adjusted based on the shape and configuration of the waveguide feed system 402.

Figure 6:
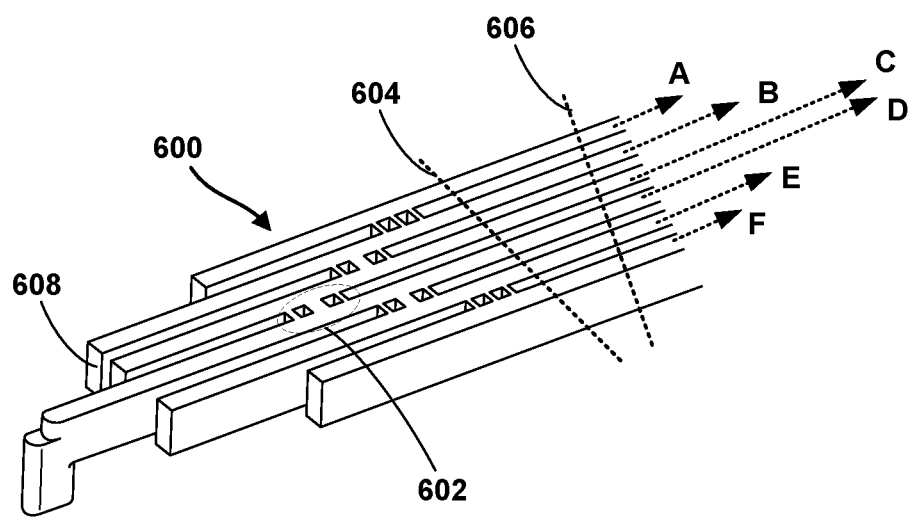
FIG. 6 illustrates an alternate view of the network of wave-dividing channels of FIG. 5, in accordance with an example embodiment.

As shown in FIG. 4, the waveguide system 400 may divide power that enters waveguide input 410 into six radiating waveguides 404a-404f. In order to divide the power from one input into 6 outputs, the waveguide system may use a three level cascade system. A first level of the cascade (between plane 408a and 408b) may be configured to split the electromagnetic energy from the waveguide input 410 into two first-level beamforming waveguides 412a and 412b. The waveguide system 400 may have a second level of the cascade (between plane 408b and 408c) that may be configured to split the electromagnetic energy from each of two first-level beamforming waveguides 412a and 412b into two respective second-level beamforming waveguides 414a-414d for each respective first-level beamforming waveguide, where one of two respective second-level beamforming waveguides 414b and 414c for each respective first-level beamforming waveguide is coupled to one of the phase-adjustment sections (shown in FIG. 6). The waveguide system 400 may also have a third level of the cascade (between plane 408c and 408d) configured to split the electromagnetic energy from one of two respective second-level beamforming waveguides 414a and 414d for each respective first-level beamforming waveguide into two respective third-level beamforming waveguides 416a-416d for each respective second-level beamforming waveguides, wherein each of the third-level beamforming waveguides is coupled to one of the phase-adjustment sections (shown in FIG. 6). In some examples, the phase-adjustment sections, which are shown in FIG. 6, may be located at plane 408d.

Figure 5:
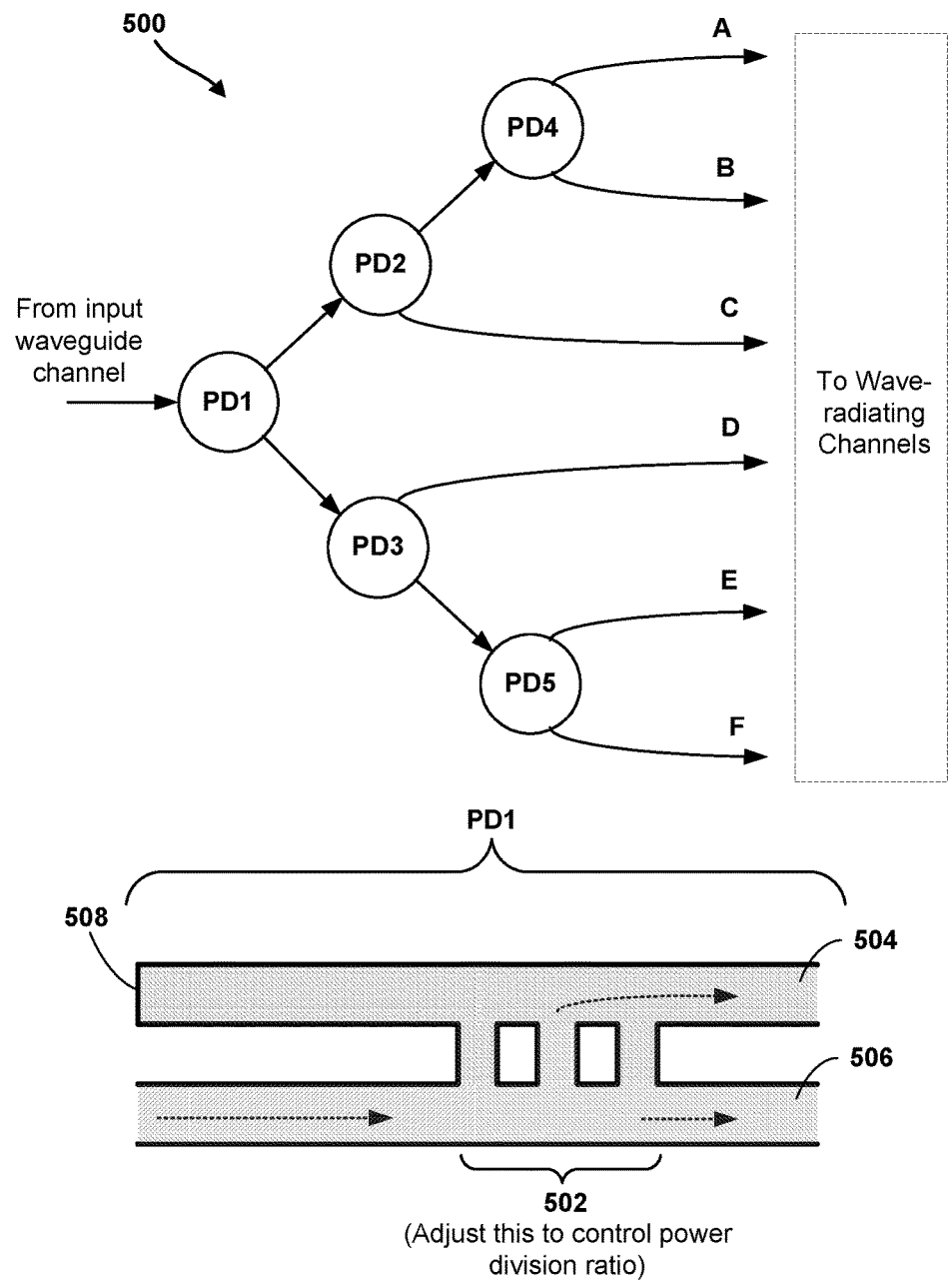
FIG. 5 illustrates a network of wave-dividing channels of an example system, in accordance with an example embodiment.

FIG. 5 illustrates a network of wave-dividing channels 500 of an example waveguide, in accordance with an example embodiment. And FIG. 6 illustrates an alternate view of the network of wave-dividing channels 600, in accordance with an example embodiment.

In some embodiments, the network (e.g., beamforming network, as noted above) of wave-dividing channels 500 may take the form of a tree of power dividers, as shown in FIG. 5. Each power divider (PD1-PD5) of the top half of FIG. 5 may be constructed in a similar manner to example PD1 shown in the bottom half of FIG. 5. Energy may enter the antenna through the input waveguide channel and is divided (i.e., split) into smaller portions of energy at each power divider, such as power divider 502, and may be divided multiple times via subsequent power dividers so that a respective amount of energy is fed into each of the wave-radiating channels (energy A-F, as shown). The amount of energy that is divided at a given power divider may be controlled by a power division ratio (i.e., how much energy goes into one channel 504 versus how much energy goes into another channel 506 after the division). A given power division ratio may be adjusted based on the dimensions of the corresponding power divider. By changing the geometry of the power divider, the ratio of power splitting may be controlled. For example, a length, width, separation distance, and other parameters of the power divider (shown as PD1) may be adjusted to achieve the desired power splitting ratio.

Further, each power divider and associated power division ratio may be designed/calculated in order to achieve a desired power taper at the wave-radiating channels. In such a case, the antenna may be designed with a Taylor window (e.g., radiation ripples drop off at edges) or other window such that sidelobes of the antenna's far-field radiation pattern may be low. As an example, the power division ratios of the power dividers may be set such that energy portions A, B, C, D, E, and F are approximately 3.2%, 15.1%, 31.7%, 31.7%, 15.1%, 3.2% of the energy, respectively. Other example power divisions are possible as well.

Within examples, a technique for dividing energy between two channels 504, 506 may be to use a structure of channels (i.e., a "four-port branchline coupler") such as that shown at the bottom of FIG. 5. In one example, such a technique and structure design may include a terminator 508 at the end of a channel, as shown in FIG. 5 (also shown as 608 in FIG. 6), where small wedges of radio frequency-absorbing material may be located to absorb energy that returns backwards through the channel to that terminator 508. In another example, the waveguide structure may feature hybrid couplers with matched loads. The matched load may absorb some electromagnetic energy in the waveguide.

In a further example, the waveguide structure may feature a power-dividing section that includes reactive elements that do not absorb electromagnetic energy. Rather, the waveguides may include reactive elements may enable electromagnetic energy to be divided with minimal power losses. For example, a waveguide similar to that shown in FIG. 4 may be constructed with reactive elements. Through different varying of reactive components, power may be divided without having to have a significant amount of electromagnetic energy absorbed. Therefore, because reactive components may be used in some examples rather than energy absorbing components, the waveguide structure may be more energy efficient.

FIG. 6 illustrates an alternate view of the network of wave-dividing channels of FIG. 5, in accordance with an example embodiment. The waveguide 600 of FIG. 6 show an example representation of the various elements described with respect to FIG. 5. For example, the waveguide 600 is configured to receive a single input and output six phase adjusted electromagnetic energy streams based on the power division ratios of the power dividers. The six phase adjusted electromagnetic energy stream may be A, B, C, D, E, and F of FIG. 6. Additionally, FIG. 6 shows six different power dividers, one of which is labeled as 602. The power dividers of FIG. 6 are organized in a manner similar to PD1-PD5 of FIG. 5. Further, FIG. 6 features a terminator 608 at the end of a channel. The terminator 608 of FIG. 6, may be similar to the terminator 508 of FIG. 5. Additionally, a terminator like terminator 608 may be located at one end of each of the six waveguide channels. In some further examples, the terminators, like terminator 608, may have other locations as well. The terminators (or loads) may be located outside of ports coupled to the respective waveguides. In other examples, the port may be located further down electromagnetic energy stream may be A, B, C, D, E, and F. Other possible location for terminators (or loads) similar to terminator 608 may be used with the present waveguide as well.

As previously discussed, both a direction and a beamwidth of a radiated beam may be adjusted based on the shape and configuration of the waveguide feed system. As discussed with respect to FIG. 5, a power taper may determine parameters of a beam radiated by the radiating elements coupled to the waveguide system. The angle of the transmitted beam may be controlled by varying a phase across the six phase adjusted electromagnetic energy streams A, B, C, D, E, and F of FIG. 6. FIG. 6 also features a phase adjustment section defined by plane 604 and plane 606. As shown in FIG. 6, planes 604 and 606 are shown as examples for sake of discussion.

In one example, for each of the six respective waveguides, the distance between planes 604 and 606 determines a phase offset for that respective waveguide. In one example, plane 604 may correspond to plane 408*d* of FIG. 4. Thus, if planes 604 and 606 are parallel, each waveguide may have the same phase offset. In some examples, when each waveguide has the same offset, the radiating elements coupled to the waveguide system may transmit a radiation beam in a broadside direction. In other examples, planes 604 and 606 may not be parallel. Therefore, by varying the angle between planes 604 and 606, and angle of the transmitted beam of the radiating elements may be adjusted.

Furthermore, phase adjustment may also be performed with lumped, or quasi-lumped, phase reversal sections. The lumped, or quasi-lumped, phase reversal sections may give a 180 degree phase reversal by using a measured waveguide length. The lumped, or quasi-lumped, phase reversal sections may also enable phase adjustments in a coherent way to allow more simple manufacturing of the waveguide device and also enable the waveguide to be designed with a specific form factor.

Figure 7:
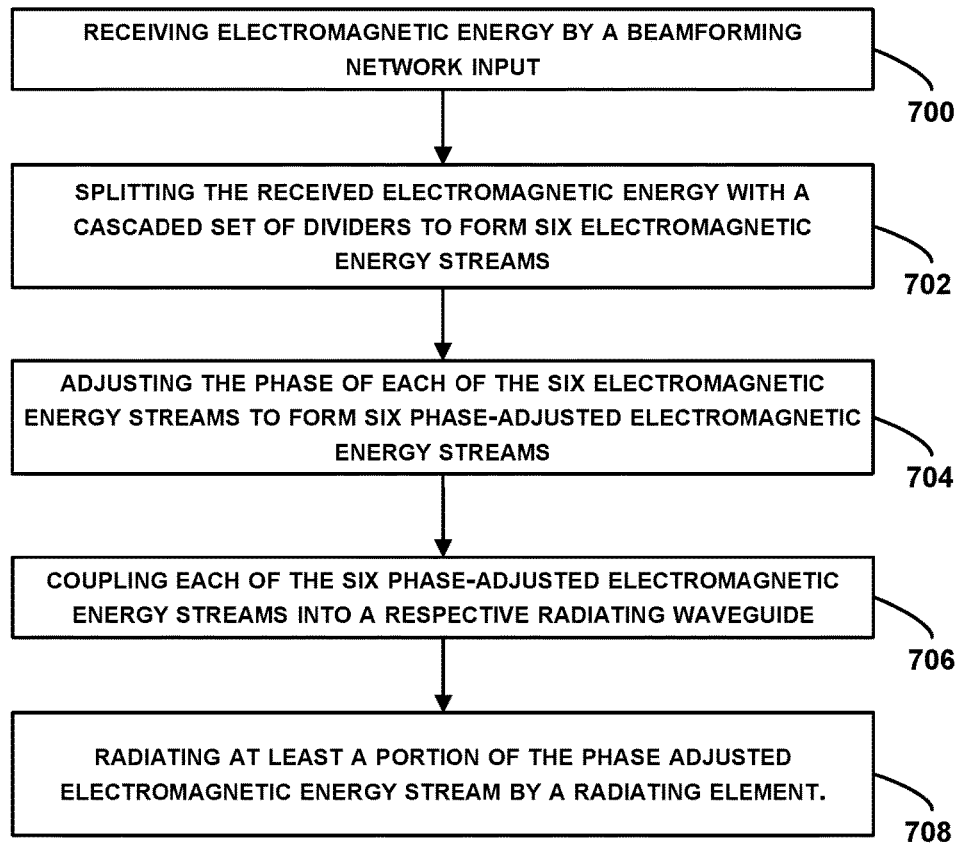
FIG. 7 is an example method for radiating electromagnetic energy with an example waveguide antenna.

FIG. 7 is an example method for a beamforming network for feeding short wall slotted waveguide arrays. Although blocks 700-708 are illustrated in a sequential order, these blocks may also be performed in parallel, and/or in a different order than those described herein. Also, the various blocks may be combined into fewer blocks, divided into additional blocks, and/or removed based upon the desired implementation.

In some embodiments, some shapes and dimensions of a waveguide antenna may be highly convenient to manufacture, though other shapes, dimensions, and methods associated therewith known or not yet known may be implemented with equal or even greater convenience. Various shapes and dimensions of portions of the manufactured waveguide antenna, such as portions of waveguide channels formed in the antenna, including shapes and dimensions other than those described herein, are possible as well. Subsequent and/or intermediate blocks may be involved as well in other embodiments.

Figure 8:
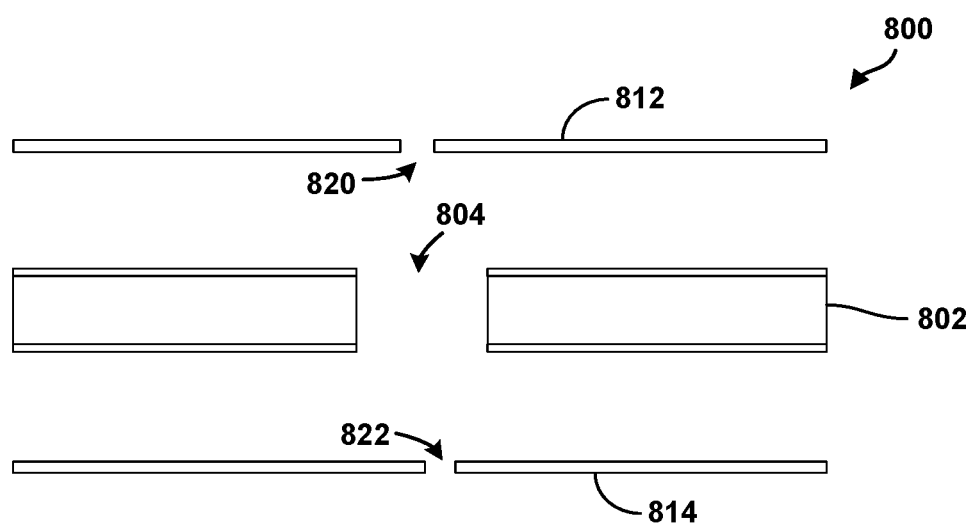
FIG. 8 illustrates an exploded view of a portion of an example waveguide apparatus.

Moreover, aspects of the method of FIG. 7 may be described with reference to FIGS. 1-4 and FIG. 8, where FIG. 8 illustrates an exploded view of a portion of an example waveguide apparatus 800.

At block 700, the method includes propagating electromagnetic energy via a waveguide in a waveguide layer. Additionally, block 700 may also include receiving electromagnetic energy by a beamforming network input. In one example, receiving electromagnetic energy by a beamforming network input may be performed via a port in a bottom layer and coupling the electromagnetic energy from the port into the waveguide.

An example waveguide layer 802 is shown in FIG. 8 along with a portion of a waveguide 804 formed into the waveguide layer. FIG. 8 shows an example waveguide apparatus 800 in a cross-section view (i.e. the view of FIG. 8 is as if a vertical slice of an example waveguide apparatus 800 was viewed head on). Within examples, the one or more waveguide channels formed into the waveguide layer may be routing waveguide channels configured to direct electromagnetic waves (e.g., millimeter electromagnetic waves), after the waves enter the waveguide antenna, to various radiating slots, such as the Z-Slots described above. These and/or other waveguide channels formed into the waveguide layer may have various shapes and dimensions, such as the dimensions noted above with respect to the waveguide 102 of FIG. 1. By way of example, one or more portions of the waveguide channels may be approximately 2.54 mm by approximately 1.27 mm, in accordance with the internal dimensions described above, where the first metal layer 802 is approximately 2.54 mm thick.

Furthermore, the bottom layer 814 may include an input port 822 configured to receive electromagnetic waves into the waveguide apparatus 800, which may then be propagated through the one or more waveguide channels 804 and be radiated out the radiating element 820. Although the input port 822 is illustrated to be directly below the radiating element 820, it should be understood that, in some embodiments, that the input port 822 may be located elsewhere in the bottom layer 814 with respect to the radiating element 820 and not located directly below the radiating element. Additionally, in some embodiments, input port 822 may actually function as an output port to allow electromagnetic energy to leave the waveguide 804.

Referring back to FIG. 7, at block 702, the method includes splitting the received electromagnetic energy with a cascaded set of dividers to form six electromagnetic energy streams. The splitting may be performed with a three-level set of cascaded dividers. The first level may be configured to split the electromagnetic energy from the beamforming network input into two first-level beamforming waveguides (such as first level guides 412*a* and 412*b* of FIG. 4). The second level of the cascade may be configured to split the electromagnetic energy from each of two first-level beamforming waveguides into two respective second-level beamforming waveguides (guides 414*a*-414*d* of FIG. 4) for each respective first-level beamforming waveguide, wherein one of two respective second-level beamforming waveguides (guides 414*b* and 414*c* of FIG. 4) for each respective first-level beamforming waveguide is coupled to one of the phase-adjustment sections. The third level of the cascade is configured to split the electromagnetic energy from one of two respective second-level beamforming waveguides (guides 414*a* and 414*d* of FIG. 4) for each respective first-level beamforming waveguide into two respective third-level beamforming waveguides (416*a*-416*d* of FIG. 4) for each respective second-level beamforming waveguides, wherein each of the third-level beamforming waveguides is coupled to a respective one of the phase-adjustment sections.

At block 704, the method includes adjusting the phase of each of the six electromagnetic energy streams by six phase-adjustment sections to form six phase-adjusted electromagnetic energy streams. As shown in FIG. 6, the phase of each electromagnetic energy stream may be adjusted based on a length of the phase-adjustment section of the respective waveguide. By lengthening a waveguide, an electromagnetic wave will propagate further in the waveguide, providing a phase offset. Conversely, by shortening a waveguide, an electromagnetic wave will propagate a shorter distance in the waveguide, providing a phase offset. Therefore, each waveguide may have an associated lengthening or shortening in the phase-adjustment section in order to provide a phase offset. The phase offset across the set of waveguides may adjust a transmission angle of a beam transmitted by antennas associated with the waveguides.

At block 706, the method includes coupling each of the six phase adjusted electromagnetic energy streams into a respective radiating waveguide of six radiating waveguides located in a waveguide layer, where each radiating waveguide is coupled to at least one radiating element located in a radiating layer. As shown in FIG. 4, each of the radiating waveguides 404a-404f may include at least one radiating element 406a-406f. The output from the phase-adjustment section of the waveguides (A-F of FIG. 6) may be coupled into the radiating waveguides 404a-404f Thus, each radiating waveguide may receive electromagnetic energy that has been both (i) adjusted for phase and (ii) had an applied power taper factor.

At block 708, the method includes for each radiating waveguide, radiating at least a portion of the phase adjusted electromagnetic energy stream by a radiating element. By way of example, as shown in FIG. 8, the top layer 812 may include at least one radiating structure 820. The radiating structure 820 may be etched, cut, or otherwise located on sheet of metal that is adhered to the middle layer 802. The radiating structure 820 may be configured to radiate electromagnetic energy coupled from inside the waveguide 804 out into free space (i.e. the radiating structure converts the guided energy in the waveguide 804 into unguided energy propagating in free space).

In some embodiments, at least a portion of the one or more waveguide channels may be formed into at least one of the radiating and bottom metal layers. For instance, a first portion of the one or more waveguide channels may be formed into the radiating metal layer, whereas a second portion and third portion of the one or more waveguide channels may be formed into the waveguide and bottom metal layers, respectively, where the second and third portions may or may not be identical. In such embodiments, when the radiating, waveguide, and bottom layers are coupled together, the layers may be coupled together such that the portions of the one or more waveguide channels of the second and/or third layers are substantially aligned with the first portion of the one or more waveguide channels of the first metal layer, thus forming one or more waveguide channels in the waveguide antenna that may be configured to propagate electromagnetic waves (e.g., millimeter electromagnetic waves). In this example, a width of the waveguide may be wider than the width of the waveguide layer, as a portion of the waveguide may also be located in the radiating layer and/or the bottom layer.

In other embodiments, the one or more waveguide channels may be formed entirely in the waveguide metal layer. In such other embodiments, the radiating and bottom metal layers may include other elements that may be configured to facilitate radiation of electromagnetic waves. For instance, as shown in FIG. 8, the radiating metal layer may include a radiating element 820, such as a radiating element that comprises a slot configured to radiate electromagnetic waves out of the waveguide apparatus 800, such as millimeter electromagnetic waves. The slot may have a rotational orientation relative to a dimension of the one or more waveguide channels. For example, the slot may be a Z-Slot or another type of slot.

It should be understood that various processes, including but not limited to those described above, may be involved with the radiating, waveguide, bottom, and/or additional layers. It should also be understood that arrangements described herein are for purposes of example only. As such, those skilled in the art will appreciate that other arrangements and other elements (e.g. machines, apparatuses, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A radar system comprising:
   a set of radiating waveguides located in a waveguide layer, each having a radiating waveguide input, wherein each radiating waveguide has a height and a width that are equal to that of each other radiating waveguide, wherein the set of radiating waveguides are aligned on a plane defined by a center of the width of at least one of the set of radiating waveguides and a length of the at least one of the set of radiating waveguides, and wherein each radiating waveguide is coupled to at least one radiating element located in a radiating layer; and
   a beamforming network located in the waveguide layer, wherein the beamforming network comprises:
      a beamforming network input;
      a set of beamforming network outputs, wherein each beamforming network output is coupled to one of the radiating waveguide input; and
      a cascaded set of dividers configured to split electromagnetic energy from the beamforming network input:
         a first level of the cascaded set of dividers configured to split the electromagnetic energy from the beamforming network input into first-level beamforming waveguides;
         a second level of the cascaded set of dividers configured to split the electromagnetic energy from each of first-level beamforming waveguides into respective second-level beamforming waveguides for each respective first-level beamforming waveguide, wherein one of the respective second-level beamforming waveguides for each respective first-level beamforming waveguide is coupled to one of the beamforming network outputs; and
         a third level of the cascaded set of dividers configured to split the electromagnetic energy from one of the respective second-level beamforming waveguides for each respective first-level beamforming waveguide into respective third-level beamforming waveguides for each respective second-level beamforming waveguides, wherein each third-level beamforming waveguide is coupled to a respective one of the beamforming network outputs.

2. The radar system according to claim 1, wherein the first level of the cascaded set of dividers is configured to divide power evenly between at least two first-level beamforming waveguides.

3. The radar system according to claim 1, wherein each radiating waveguide of the set of radiating waveguides has a predetermined amplitude taper factor, and wherein the beamforming network is configured to provide an electromagnetic signal having an amplitude proportional to the predetermined amplitude taper factor of the respective radiating waveguide to the radiating waveguide input of the respective radiating waveguide.

4. The radar system according to claim 1, wherein the cascaded set of dividers comprises reactive elements.

5. The radar system according to claim 1, wherein the cascaded set of dividers comprises hybrids each having matched loads.

6. The radar system according to claim 1, wherein each beamforming waveguide has a width equal to the width of each radiating waveguide.

7. The radar system according to claim 1, wherein each radiating waveguide of the set of radiating waveguides has a predetermined phase shift defined by a length of a corresponding phase-adjustment section.

8. The radar system according to claim 1, wherein each radiating element:
  comprises a respective slot defined by a respective angular or curved path, and
  has an effective length greater than the height of the respective radiating waveguide, wherein the effective length is measured along the respective angular or curved path of the respective slot.

9. The radar system according to claim 1, wherein the at least one radiating element is configured to operate at approximately 77 Gigahertz (GHz) and propagate millimeter (mm) electromagnetic waves.

10. A method of radiating electromagnetic energy comprising:
  receiving electromagnetic energy by a beamforming network input;
  splitting the received electromagnetic energy with a cascaded set of dividers to form a set of electromagnetic energy streams coupled into a set of radiating waveguides, wherein the splitting comprises:
    splitting the electromagnetic energy from the beamforming network input into first-level beamforming waveguides by a first level of the cascaded set of dividers;
    splitting the electromagnetic energy from each of first-level beamforming waveguides into respective second-level beamforming waveguides for each respective first-level beamforming waveguide by a second level of the cascaded set of dividers, wherein one of respective second-level beamforming waveguides for each respective first-level beamforming waveguide is coupled to a respective one of the set of radiating waveguides; and
    splitting the electromagnetic energy from one of respective second-level beamforming waveguides for each respective first-level beamforming waveguide into respective third-level beamforming waveguides for each respective second-level beamforming waveguides by a third level of the cascaded set of dividers, wherein each third-level beamforming waveguide is coupled to a respective one of the set of radiating waveguides;
  coupling each respective output of the cascaded set of dividers into a respective radiating waveguide of the set of radiating waveguides located in a waveguide layer, wherein each radiating waveguide is coupled to at least one radiating element located in a radiating layer; and
  for each radiating waveguide, radiating at least a portion of the respective electromagnetic energy stream by a radiating element.

11. The method according to claim 10, further comprising dividing power evenly between the first-level beamforming waveguides by the first level of the cascaded set of dividers.

12. The method according to claim 10, wherein each radiating waveguide of the set of radiating waveguides has a predetermined amplitude taper factor, and further comprising providing an electromagnetic signal having an amplitude proportional to the predetermined amplitude taper factor of the respective radiating waveguide to a radiating waveguide input of the respective radiating waveguide.

13. The method according to claim 10, wherein the cascaded set of dividers comprises reactive elements.

14. The method according to claim 10, wherein the cascaded set of dividers comprises hybrids each having matched loads.

15. The method according to claim 10, wherein each beamforming waveguide has a width equal to the width of each radiating waveguide.

16. The method according to claim 10, wherein each radiating waveguide of the set of radiating waveguides has a predetermined phase shift defined by a length of a corresponding phase-adjustment section.

17. The method according to claim 10, wherein each radiating element:
  comprises a respective slot defined by a respective angular or curved path, and
  has an effective length greater than the height of the respective radiating waveguide, wherein the effective length is measured along the respective angular or curved path of the respective slot.

18. The method according to claim 10, wherein the electromagnetic energy has a frequency of approximately 77 Gigahertz (GHz).

* * * * *